(12) United States Patent
Mongeau et al.

(10) Patent No.: US 8,907,517 B2
(45) Date of Patent: Dec. 9, 2014

(54) WIND TURBINE POWER TRANSMISSION SYSTEM

(75) Inventors: Peter Mongeau, Center Conway, NH (US); Siddharth Ashar, Munich (DE); Jens Demtröder, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 52 days.

(21) Appl. No.: 13/879,985

(22) PCT Filed: Oct. 17, 2011

(86) PCT No.: PCT/DK2011/050389
§ 371 (c)(1),
(2), (4) Date: Jul. 2, 2013

(87) PCT Pub. No.: WO2012/052023
PCT Pub. Date: Apr. 26, 2012

(65) Prior Publication Data
US 2013/0270837 A1 Oct. 17, 2013

Related U.S. Application Data

(60) Provisional application No. 61/393,995, filed on Oct. 18, 2010, provisional application No. 61/450,151, filed on Mar. 8, 2011.

(51) Int. Cl.
*F03D 9/00* (2006.01)
*H02K 7/18* (2006.01)
*F03D 1/00* (2006.01)
*F03D 11/02* (2006.01)
*F16H 1/46* (2006.01)

(52) U.S. Cl.
CPC ............... *F03D 9/002* (2013.01); *Y02E 10/728* (2013.01); *H02K 7/1838* (2013.01); *F16H 1/46* (2013.01); *Y02E 10/725* (2013.01); *F03D 1/001* (2013.01); *Y02E 10/722* (2013.01); *F03D 11/02* (2013.01)
USPC .......................................................... 290/55

(58) Field of Classification Search
CPC ......................................................... F03D 9/00
USPC ............................................................. 290/55
See application file for complete search history.

(56) References Cited

U.S. PATENT DOCUMENTS 4,734,590 A * 3/1988 Fluegel ........................ 290/1 C
5,663,600 A * 9/1997 Baek et al. ...................... 290/55
(Continued)

FOREIGN PATENT DOCUMENTS

DE 102007012408 A1 9/2008
DE 102008044900 A1 3/2010
(Continued)

OTHER PUBLICATIONS

European Patent Office, Search Report issued in corresponding PCT Application No. PCT/DK2011/050389 dated Feb. 23, 2013, 3 pages.

*Primary Examiner* — Joseph Waks
(74) *Attorney, Agent, or Firm* — Wood, Herron & Evans, LLP

(57) ABSTRACT

A power transmission system for a wind turbine comprises a gearbox and generator. The gearbox includes a gearbox housing and gearbox output member. The generator includes: a generator housing having a drive-end side and non-drive-end side, the drive-end side being coupled to the gearbox housing; a stator supported by the generator housing; a rotor having a rotor shaft coupled to the gearbox output member and a rotor body coupled to the rotor shaft; a non-drive-end shield coupled to the non-drive-end side; a spindle extending from the non-drive-end shield in the axial direction; and at least one generator bearing positioned between the rotor shaft and spindle. The generator bearing(s) support the gearbox output member and rotor shaft. A method of assembling or servicing such a power transmission system is also provided.

23 Claims, 10 Drawing Sheets

(56) References Cited

U.S. PATENT DOCUMENTS

| | | | |
|---|---|---|---|
| 6,459,165 B1 * | 10/2002 | Schoo | 290/1 C |
| 7,538,446 B2 * | 5/2009 | Bonnet | 290/55 |
| 7,815,536 B2 * | 10/2010 | Jansen et al. | 475/159 |
| 8,343,009 B2 * | 1/2013 | Berger et al. | 475/337 |
| 8,376,708 B2 * | 2/2013 | Patel et al. | 416/169 R |
| 8,405,243 B2 * | 3/2013 | Siegfriedsen | 290/55 |
| 2010/0133854 A1 | 6/2010 | Jansen | |
| 2013/0300124 A1 * | 11/2013 | Chobot et al. | 290/55 |
| 2013/0300125 A1 * | 11/2013 | Ruschoff et al. | 290/55 |
| 2013/0302144 A1 * | 11/2013 | Demtroder et al. | 415/124.2 |

FOREIGN PATENT DOCUMENTS

| | | |
|---|---|---|
| EP | 1167754 A2 | 1/2002 |
| JP | 2011127451 A * | 6/2011 |

* cited by examiner

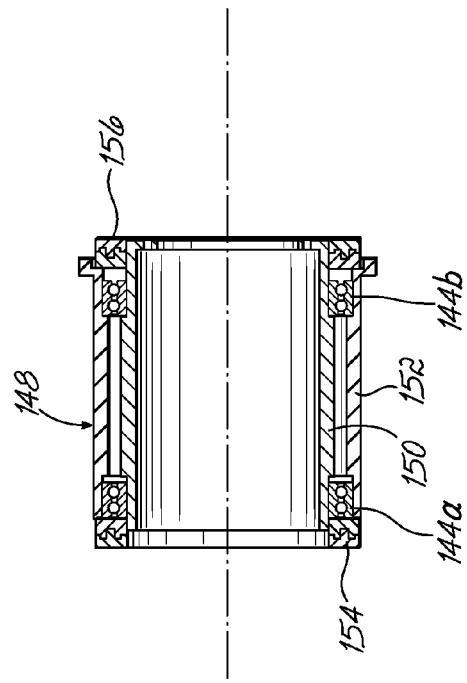
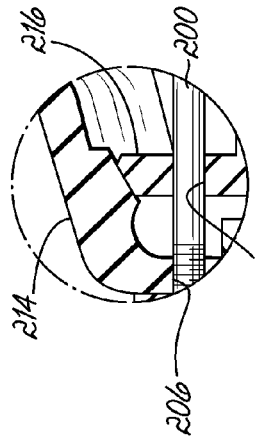
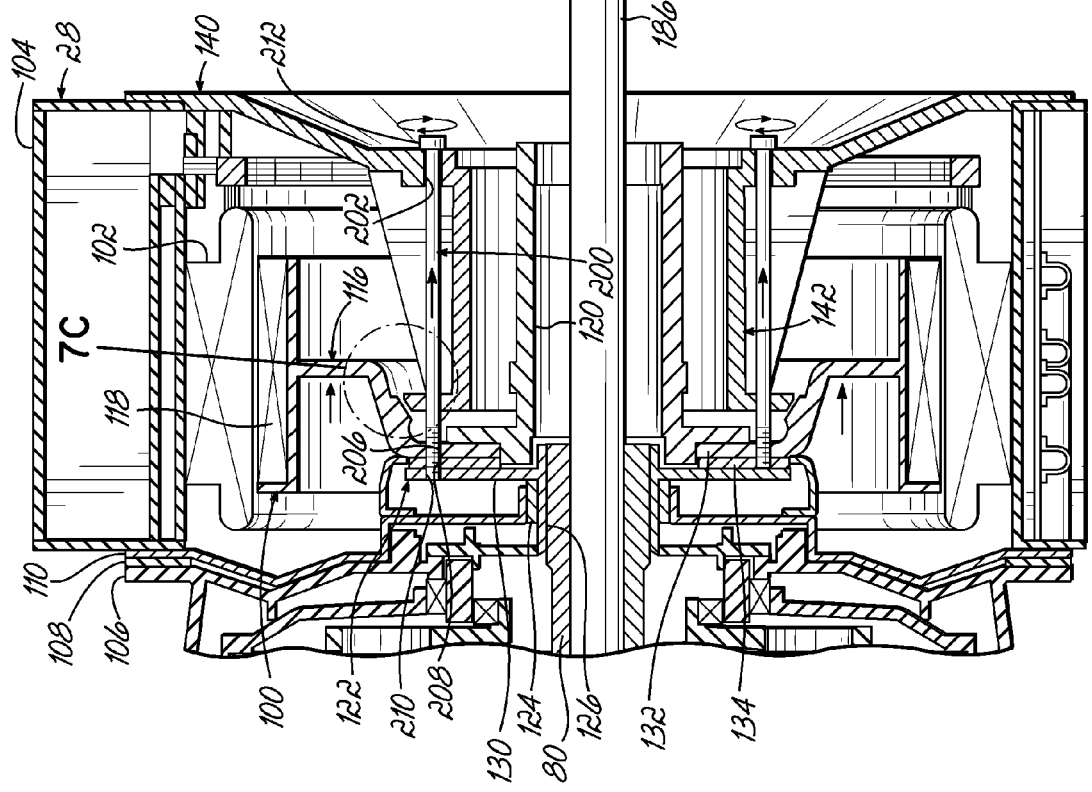
FIG. 7C
FIG. 7B

WIND TURBINE POWER TRANSMISSION SYSTEM

CROSS-REFERENCE

This application claims the benefit of U.S. Provisional Patent Application No. 61/393,995, filed on Oct. 18, 2010 and entitled "DRIVETRAIN FOR A WIND TURBINE". This application also claims the benefit of U.S. Provisional Patent Application No. 61/450,151, filed Mar. 8, 2011 and entitled "WIND TURBINE POWER TRANSMISSION SYS IEM".

TECHNICAL FIELD

The present invention relates to power transmission systems. More specifically, the present invention relates to wind turbine power transmission systems having an integrated gearbox and generator.

BACKGROUND

Wind turbines typically include a rotor with large blades driven by the wind. The rotor blades convert the kinetic energy of the wind into rotational mechanical energy. The mechanical energy usually drives one or more generators to produce electrical power. Thus, wind turbines include a power transmission system to process and convert the rotational mechanical energy into electrical energy. The power transmission system is sometimes referred to as the "power train" of the wind turbine. The portion of a power transmission system from the wind turbine rotor to the generator is referred to as the drive train.

Oftentimes it is necessary to increase the rotational speed of the wind turbine rotor to the speed required by the generator(s). This is accomplished by a gearbox between the wind turbine rotor and generator. Thus, the gearbox forms part of the drive train and converts a low-speed, high-torque input from the wind turbine rotor into a lower-torque, higher-speed output for the generator. Although gearboxes are used in many industries, there are particular challenges in designing them for wind turbines due to the magnitude, variety, and unpredictability of forces experienced by the wind turbine rotor and drive train. These forces have the potential to damage bearings and other gearbox components. As a result, gearbox reliability has traditionally been a concern in the wind power industry.

Some manufacturers address this concern by designing power transmission systems without a gear stage. The wind turbine rotor directly drives a low-speed generator in such systems. Although there may be no concerns about gearbox reliability, the lack of a gear stage often gives rise to other concerns. In particular, the low-speed generators in direct-drive wind turbines are typically larger than their high and medium-speed counterparts in geared solutions to produce equivalent amounts of power. The larger size presents transportation, assembly, and maintenance challenges in addition to cost concerns. Moreover, many of the low-speed generators rely upon permanent magnets incorporating rare earth materials of limited availability.

The competing concerns between traditional drive trains and direct-drive machines has led to increased interest in medium-speed solutions. These "hybrid" solutions typically include an integrated gearbox and medium-speed generator. One such solution is the subject of EP 0 811 764 B1, which discloses a medium-speed, permanent magnet generator mounted to a single stage gearbox. The design was originally conceived by Aerodyn GmbH and has been further developed by Areva. Sometimes referred to as the "multibrid" solution, the design results in a lightweight, compact power transmission system with fewer rotating parts than most traditional drive trains.

Despite the interest in medium-speed solutions, there remains room for improvement. The highly-integrated nature of the designs may limit assembly options and make service difficult. Therefore, there is a need for a power transmission system that addresses these and other challenges.

SUMMARY

A power transmission system for a wind turbine is disclosed below. The power transmission system comprises a gearbox and generator. The gearbox includes a gearbox housing and gearbox output member. The generator includes: a generator housing having a drive-end side and non-drive-end side, the drive-end side being coupled to the gearbox housing; a stator supported by the generator housing; a rotor having a rotor shaft coupled to the gearbox output member and a rotor body supported by the rotor shaft; a non-drive-end shield coupled to the non-drive-end side of the generator housing; a spindle extending from the non-drive-end shield in the axial direction; and at least one generator bearing positioned between the rotor shaft and spindle. The generator bearing(s) support the gearbox output member and rotor shaft. To this end, the term "generator bearing" is used herein to refer to a bearing common to the gearbox and generator and necessary for their operation. The generator bearing(s) serve as a primary means for rotatably supporting the gearbox output member and rotor shaft. In some embodiments, the generator bearing(s) may even be the only rotatable support for these components.

By positioning the generator bearing(s) between the rotor shaft and spindle, the generator bearing(s) are effectively positioned on the non-drive-end side of the generator housing. Such an arrangement facilitates assembly and service for reasons that will be apparent based on the description below. Further advantages are provided if the spindle is spaced from the rotor but configured to contact the rotor when the rotor is moved toward the non-drive-end shield. Such an arrangement allows the rotor to be "parked" on the spindle during transportation and/or maintenance, thereby allowing the generator bearing(s) to be installed or removed without having to remove the rotor and without having de-couple the generator housing from the gearbox housing.

To this end, a corresponding method of assembling or servicing a power transmission system is also disclosed. The method involves providing a gearbox having a gearbox housing and a gearbox output member extending from the gearbox housing. A generator is also provided. The generator includes a generator housing with a drive-end side and non-drive-end side, a stator supported by the generator housing between the drive-end side and non-drive-end side, a non-drive-end shield coupled to the non-drive-end side of the generator housing, a spindle extending from the non-drive-end shield in the axial direction, and a rotor with a rotor shaft and rotor body supported by the rotor shaft. At least a portion of the rotor shaft extends in an axial direction.

The method further involves positioning at least one generator bearing between the rotor shaft and spindle. Again, the generator bearing(s) support the gearbox output member and rotor shaft. Integrating the gearbox and generator is another step, which includes coupling the drive-end side of the generator housing to the gearbox housing and coupling the rotor shaft to the gearbox output member. This integration may be performed before positioning the generator bearing(s), as may be the case when the method relates to service such that the positioning of the generator bearing(s) represents their replacement. It could also be the case when the method relates to assembly and the generator bearing(s) are transported and/or installed separately from the rest of the generator. The integration step may alternatively be performed after positioning the generator bearing(s), as may be the case when the generator is assembled and transported with the generator bearing(s) installed.

Regardless, the method illustrates the advantages relating to assembly and service resulting from the design of the power transmission system. Again, these advantages will be more apparent based on the description below.

BRIEF DESCRIPTION OF THE DRAWINGS

FIGS. 7A-7C are cross-sectional views sequentially illustrating the removal of generator bearings from the generator in the power transmission system of FIG. 2.

DETAILED DESCRIPTION

Figure 1:
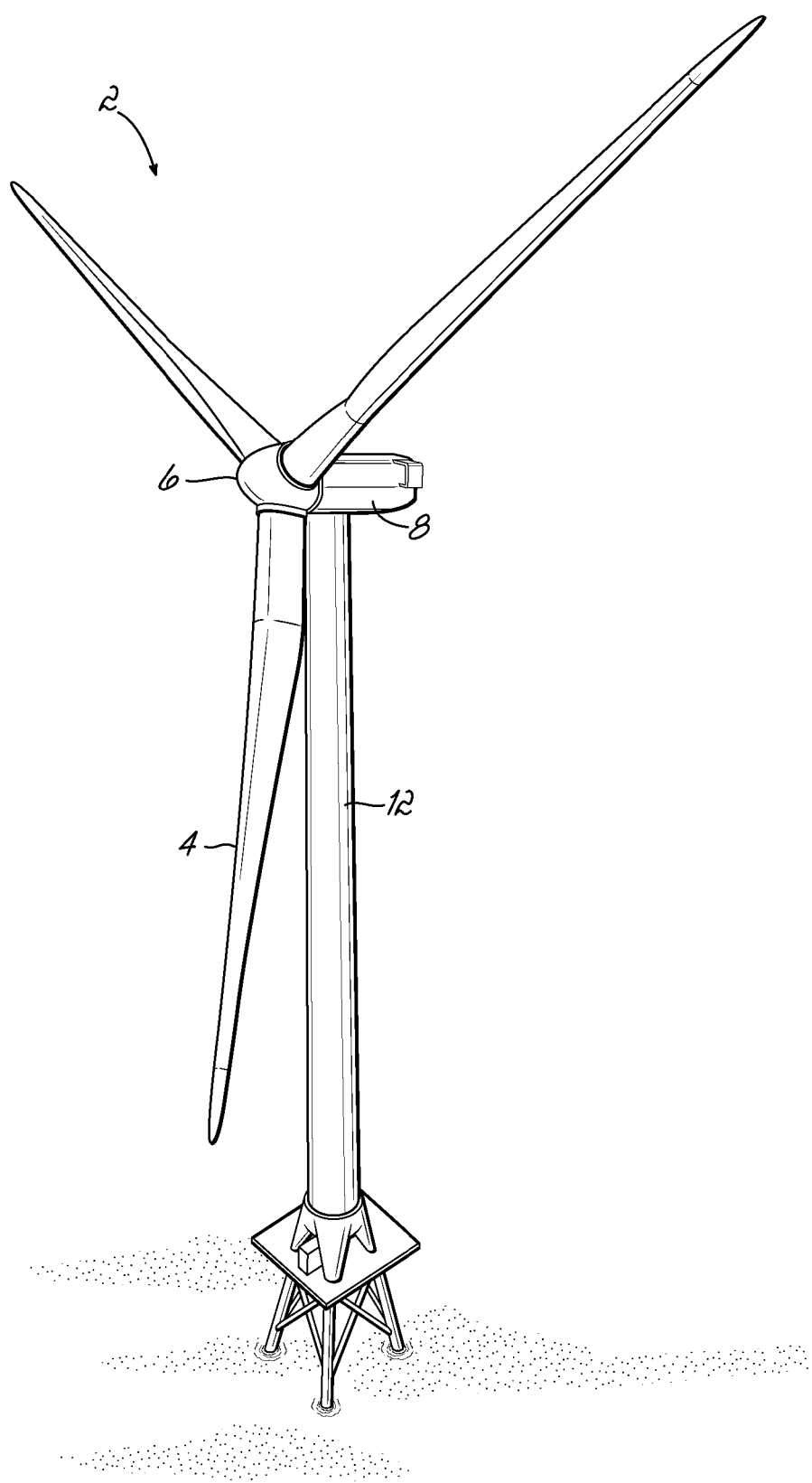
FIG. 1 is a perspective view of one example of a wind turbine.
Figure 2:
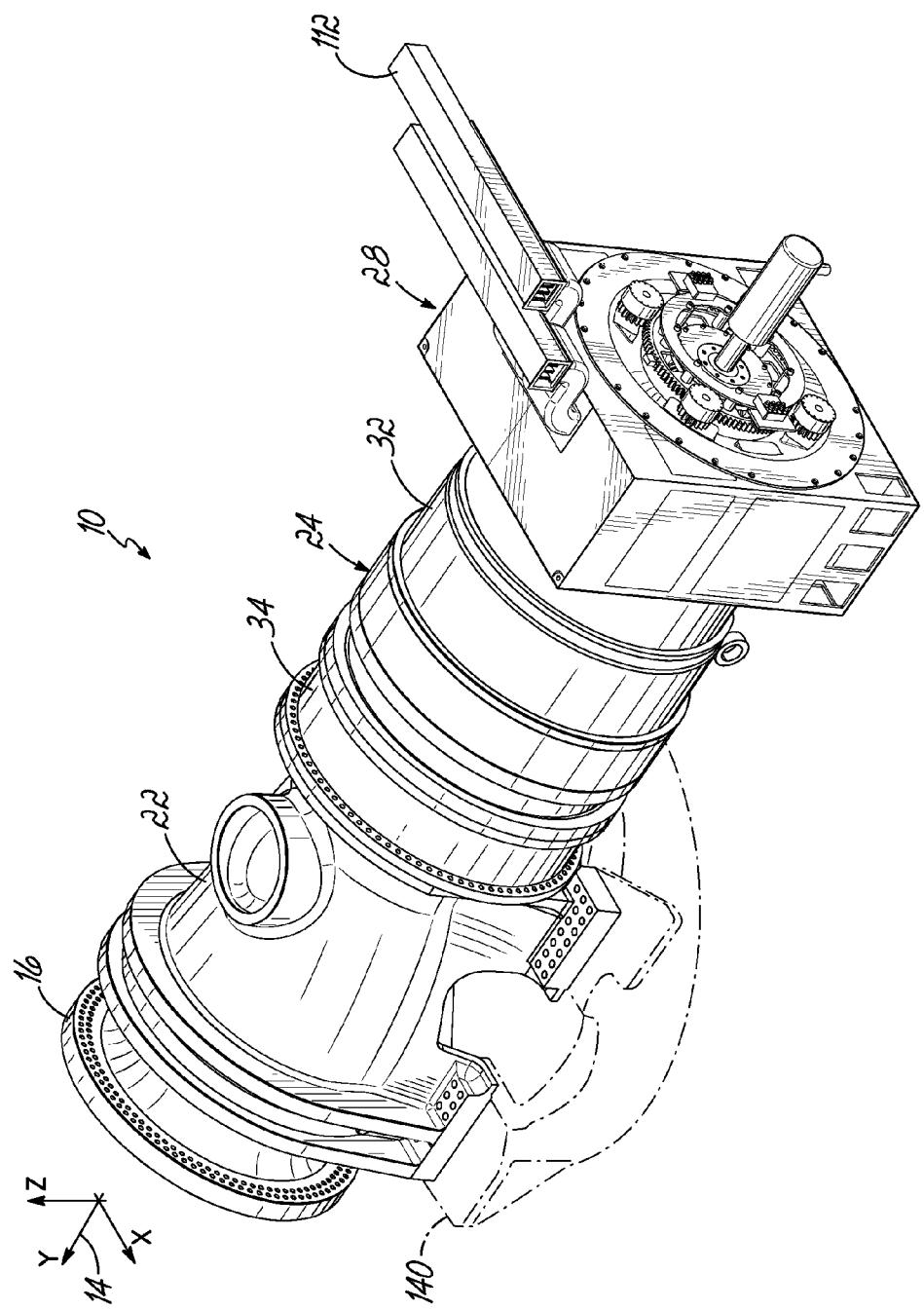
FIG. 2 is a perspective view of a power transmission system for the wind turbine of FIG. 1.

FIG. 1 shows one example of a wind turbine 2. Although an offshore wind turbine is shown, it should be noted that the description below may be applicable to other types of wind turbines. The wind turbine 2 includes rotor blades 4 mounted to a hub 6, which is supported by a nacelle 8 on a tower 12. Wind causes the rotor blades 4 and hub 6 to rotate about a main axis 14 (FIG. 2). This rotational energy is delivered to a power transmission system (or "power train") 10 housed within the nacelle 8.

Figure 3:
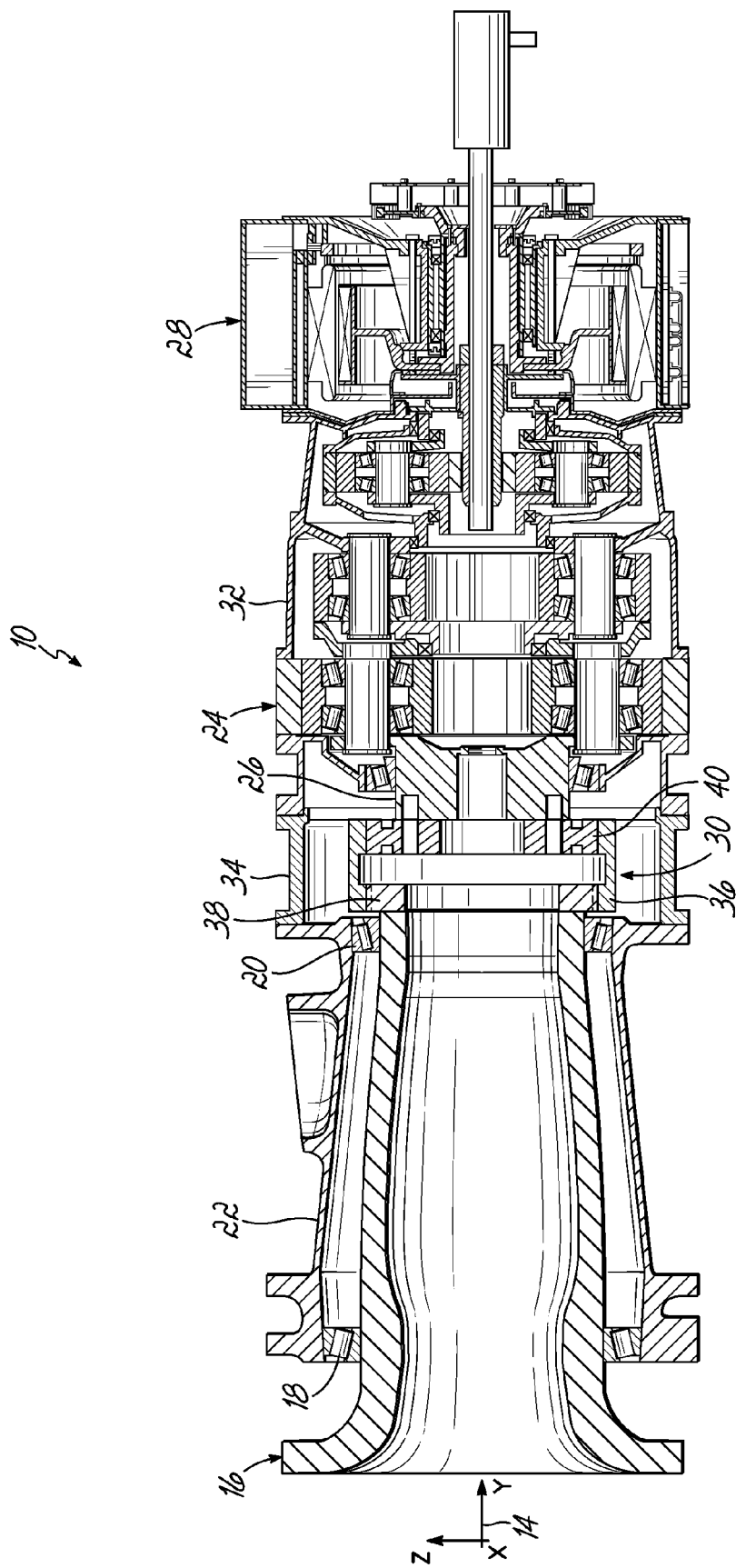
FIG. 3 is a cross-sectional view of the power transmission system of FIG. 2.

As shown in FIGS. 2 and 3, the power transmission system 10 includes a main shaft 16 coupled to the hub 6 (FIG. 1). The power transmission system 10 also includes first and second bearings 18, 20 supporting the main shaft 16, a bearing housing 22 surrounding the first and second bearings 18, 20, and a gearbox 24 having a gearbox input member 26 driven by the main shaft 16. The gearbox 24 increases the rotational speed of the main shaft 16 to drive a generator 28, as will be described in greater detail below.

In the particular embodiment shown, the gearbox 24 and generator 28 are suspended from the bearing housing 22 and main shaft 16; there is no support for the gearbox 24 or generator 28 themselves. More specifically, the gearbox 24 includes the gearbox input member 26, which is coupled to the main shaft 16 by a coupling 30, and a gearbox housing 32, which is suspended from the bearing housing 22 via a coupling housing 34. The coupling 30 is shown as a curved tooth gear coupling including a ring spline coupling element 36 that engages coupling flanges 38, 40 associated with the main shaft 16 and gearbox input member 26, respectively. This and other embodiments of the coupling 30, along with the overall kinematics of the power transmission system 10, are described in more detail in PCT Patent Application No. PCT/DK2011/050388 ("the '388 application"), also entitled "WIND TURBINE POWER TRANSMISSION SYSTEM" and filed concurrently herewith, the disclosure of which is fully incorporated herein by reference. As described in the '388 application, particular kinematic relationships are provided that enable the power transmission system 10 to accomplish its primary function—the transfer of torque—in a reliable manner. The kinematic relationships also help the power transmission system 10 achieve its secondary function—the transfer of loads other than torque from a rotor to a tower—in an advantageous manner.

Figure 4:
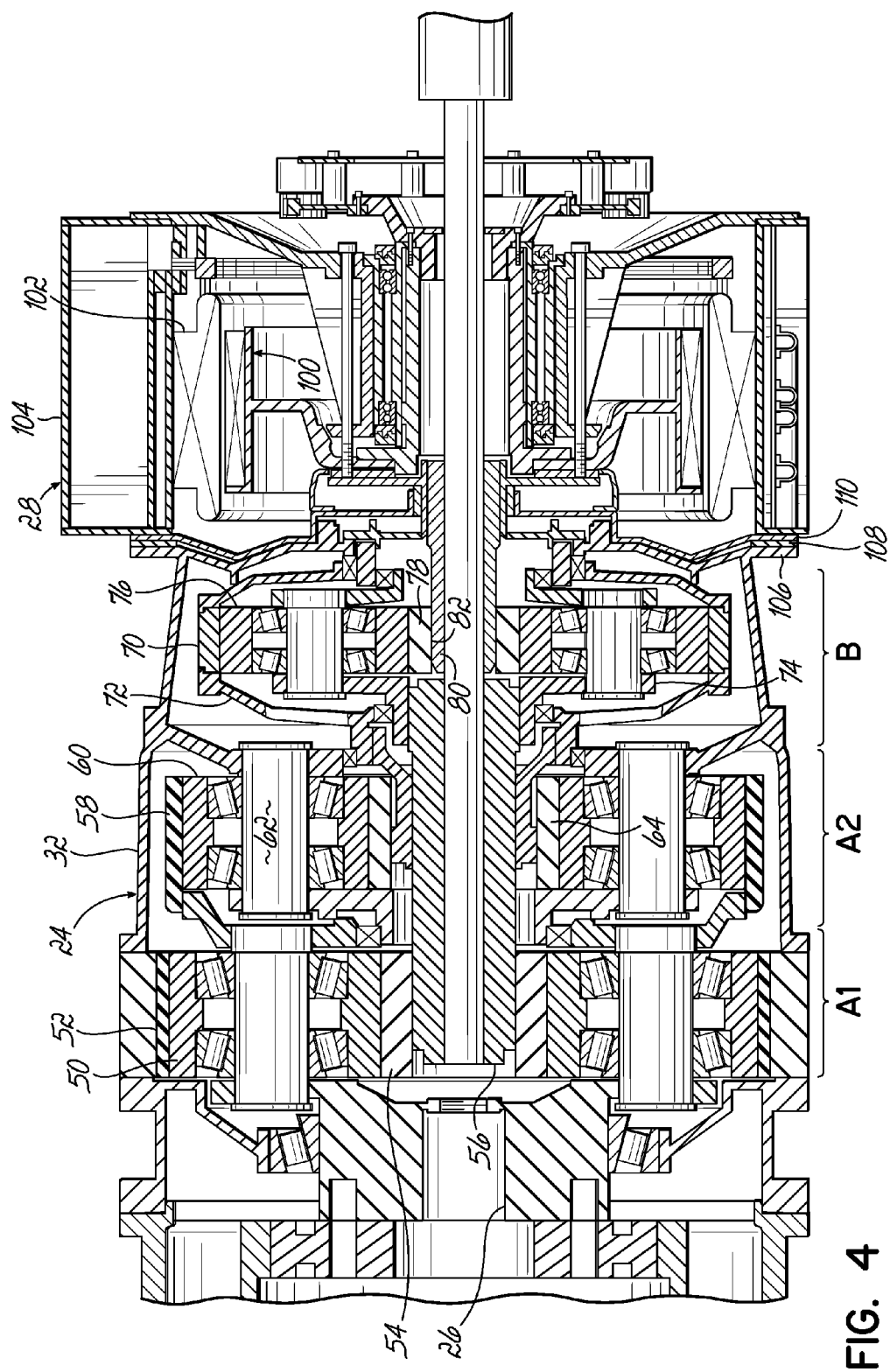
FIG. 4 is a cross-sectional view showing a gearbox and generator of the power transmission system of FIG. 2 in further detail.

The details of the gearbox 24 and generator 28 will now be described with reference to FIGS. 4 and 4A. The gearbox 24 is shown as a differential gearbox with three planetary stages. More specifically, the gearbox input member 26 in the embodiment shown is a planetary carrier supporting planet wheels 50 in a first stage A1. The planet wheels 50 mesh with a ring gear 52, which is fixed relative to the gearbox housing 32, and with a sun pinion 54 on a sun shaft 56. The gearbox input member 26 also supports a ring gear 58 in a second stage A2 such that the ring gear 58 rotates with the gearbox input member 26. The ring gear 58 in the second stage A2 meshes with planet wheels 60, which are supported by planet pins 62 mounted to the gearbox housing 32. As a result, the planet wheels 60 drive a sun pinion 64 in an opposite direction than the sun pinion 54.

The above-described arrangement splits the power delivered by the gearbox input member 26 between the first stage A1 and second stage A2, whose outputs are represented by the sun pinions 54 and 64. The components, gear ratios, etc. may be designed to provide any desired power distribution (e.g., it may be 60/40). The power outputs are merged in a third stage B, which includes a ring gear 70 drivingly coupled to the sun pinion 64 via supporting structure 72 and a planet carrier 74 drivingly coupled to the sun pinion 54 via the sun shaft 56. Planet wheels 76 rotatably supported by the planet carrier 74 mesh with the ring gear 70 and with a sun pinion 78, the latter driving a gearbox output member 80.

The sun pinion 78 is shown as a separate component engaging the gearbox output member 80 via a spline coupling 82, but may alternatively be mounted to the gearbox output member 80 or even formed as an integral portion of the gearbox output member 80. Indeed, although the details of the gearbox 24 have been described, the present invention focuses on the integration of the gearbox 24 and generator 28 rather than the gearbox itself or its components. Thus, the embodiment shown is merely one example; any other gearbox design suitable for wind turbines may be used instead. This includes, for example, conventional planetary gearboxes, compound planetary gearboxes, fixed-carrier planetary gearboxes, etc., each involving single or multiple stages.

Regardless of the gearbox design, the generator 28 includes a rotor 100 and stator 102 positioned within a generator housing 104. The rotor 100 is driven by the gearbox output member 80 to rotate within the generator housing 104 and, as a result, effectively divides the generator housing 104 into a drive-end side ("DE side") and non-drive-end side ("NDE side"). On the DE side, the generator housing 104 is coupled to the gearbox housing 32 using fasteners (e.g., bolts; not shown) or other suitable techniques. A reinforced flange 106 (FIG. 4A) may be provided on the gearbox housing 32 for this purpose. An isolation member 108 may also be provided between the flange 106 and generator housing 104 to help prevent electrical currents from being transferred to the gearbox 24. Additionally, the generator 28 may further include a drive-end shield ("DE shield") 110 between the gearbox housing 32 and generator housing 104. The DE shield 110 is coupled to the generator housing 104 and covers the DE side to protect the internal components of the generator 28 during transport, as will be described in greater detail below, but need not be provided if such protection is not necessary. The gearbox housing 32 may effectively cover the DE side of the generator housing 104 after integration of the gearbox 24 and generator 28 in such embodiments.

The stator 102 is supported by the generator housing 104 between the DE and NDE sides. The stator 102 is shown schematically in the figures, but in one embodiment the generator 28 may be a permanent-magnet generator with the stator 102 comprising a resin-impregnated assembly of steel laminations forming teeth on an iron core. The assembly may also include coils arranged in a distributed winding pattern between the teeth. When the rotor 100 rotates relative to the stator 102, permanent magnets on the rotor 102 induce a voltage in the windings. The windings are connected to a copper bus ring (not shown), which in turn is connected to power cables 112 (FIG. 2) for delivering the electrical output elsewhere. Again, this is merely one possible embodiment. Other embodiments will be appreciated by persons skilled in wind turbine generator design, including those not involving permanent magnets.

The rotor 100 includes a rotor body 116 supporting the permanent magnets (or other flux-generating members, depending on the generator design). The permanent magnets may be, for example, held in core segments 118 secured to the rotor body 116. A rotor shaft ("drive hub") 120 is coupled to the rotor body 116 by being secured thereto (e.g., by fasteners) or integrally formed therewith. Thus, although in general a two-piece assembly for supporting the permanent magnets is shown, in alternative embodiments the rotor shaft 120 and rotor body 116 may be different portions of a unitary structure. At least a portion of the rotor shaft 120 extends in an axial direction.

The rotor shaft 120 is also coupled to the gearbox output member 80. In the embodiment shown, a floating shaft 122 is provided for this purpose. The floating shaft 122 extends from within the gearbox housing 32, through an opening in the DE shield 110, and into the generator housing 104. A labyrinth seal 124 may be provided between the DE shield 110 and exterior of the floating shaft 122 to allow relative rotation yet prevent gearbox lubricant from entering the generator housing 104. Static seals (not shown) may also be provided between the gearbox housing 32 and DE shield 110 to further assist fluid containment. The interior of the floating shaft 122, on the other hand, is coupled to the gearbox output member 80 by a spline coupling 126 so that the floating shaft 122 is driven by the gearbox output member 80. In this regard, the gearbox output member 80 in the embodiment shown functions as a quill shaft to transfer torque from the gearbox 24 to the generator 28 (via the floating shaft 122). The length of the floating shaft 122, which may extend into the rotor shaft 120, and axial location of the spline coupling 126 may be selected to help tune the torsional resonance of the power transmission system 10.

Within the generator housing 104, a radially-extending flange 130 on the floating shaft 122 confronts a radially-extending portion 132 of the rotor body 116 and/or rotor shaft 120. This allows the floating shaft 122 to be coupled to the rotor 100 using bolts, pins, face gearing, or other coupling elements/methods. Displacement elements 200 in the form of elongated bolts, whose purpose will be described below, may partially or fully serve this coupling function. As an alternative or additional way of coupling the floating shaft 122 to the rotor 100, a terminal portion of the floating shaft 100 may extend into and engage the rotor shaft 120 via a spline coupling. An isolation member 134 may be provided between the flange 130 and the part of the rotor 100 to which it is coupled to help prevent electrical currents from being transferred to the gearbox 24. The isolation member 134 is shown as a ring in the illustrated embodiment.

Other embodiments of the gearbox output member 80 and the way it is coupled to the rotor 100 will be appreciated. For example, the gearbox output member 80 may alternatively include a large connection flange for coupling directly to the rotor 100 (such that there is no need for the floating shaft 122). The connection flange may be bolted or otherwise secured to the rotor body 116 and/or rotor shaft 120 in the same manner as described above for the floating shaft 122. Such a design provides a wear-free interface between the gearbox output member 80 and rotor 100. Additionally, the connection flange may be designed with high torsional and low bending stiffness. This provides the gearbox output member 80 with sufficient flexibility to allow the sun pinion 78 to translate radially and align angularly with the planet gears 76 when necessary (thereby reducing or preventing misalignments).

Figure 4A:
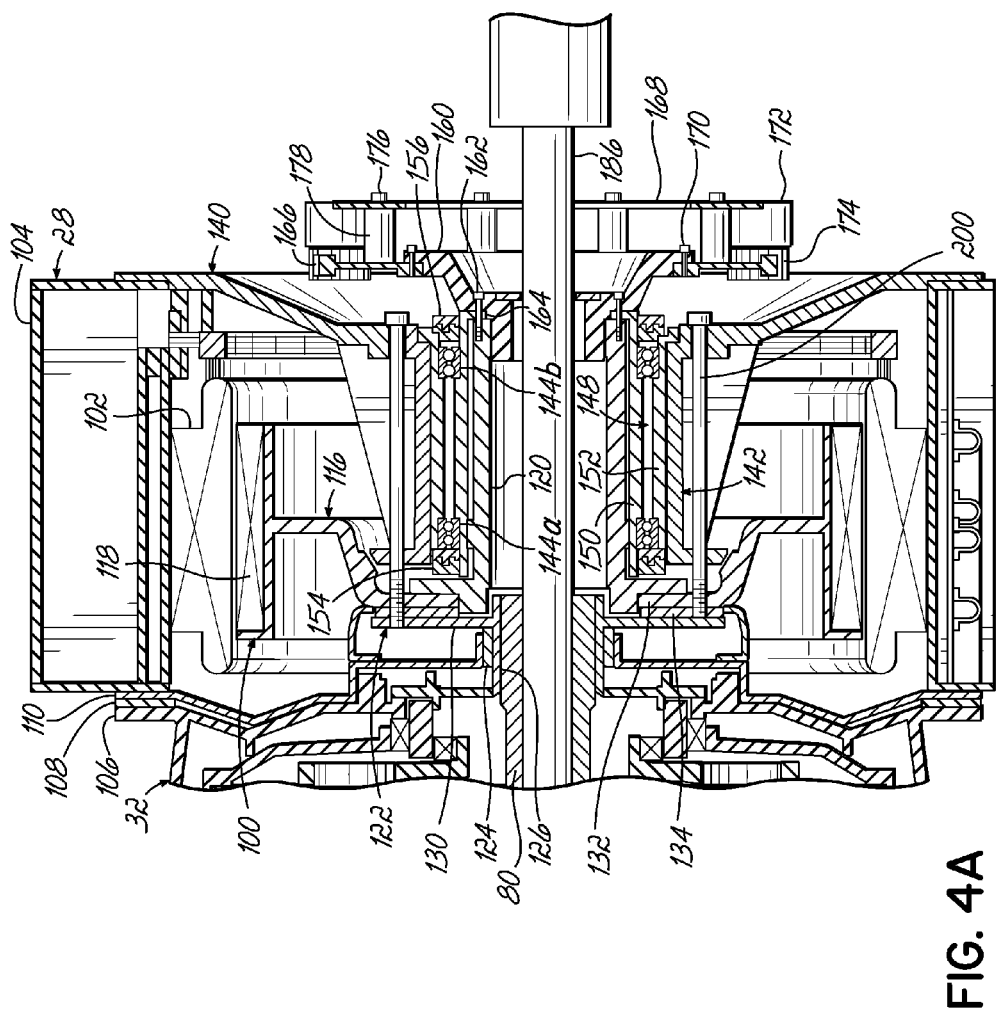
FIG. 4A is an enlarged cross-sectional view showing the generator of FIG. 4 in further detail.

Still referring to FIG. 4A, the generator 28 further includes a non-drive-end shield ("NDE shield") 140 coupled to the NDE side of the generator housing 104. A spindle 142 extends from the NDE shield 140 in a generally axial direction and, in the embodiment shown, surrounds the rotor shaft 120. The spindle 142 may be integrally formed with the remainder of the NDE shield 140 (as shown), or the spindle 142 may a separate component secured to the NDE shield 140. At least one generator bearing 144 is positioned between the spindle 142 and the rotor shaft 120 for rotatably supporting the rotor 100. Thus, the rotor 100 is supported by the generator housing 104 via the generator bearing(s) 144, spindle 142, and NDE shield 140. First and second generator bearings 144a, 144b are provided in the embodiment shown. These bearings also support the gearbox output member 80, as will be described in greater detail below.

The first and second generator bearings 144a, 144b may be housed within a bearing cartridge 148. More specifically, the bearing cartridge 148 includes an inner sleeve 150 coupled to the rotor shaft 120 and an outer sleeve 152 interfacing with the spindle 142. The first and second generator bearings 144a, 144b are positioned between the inner and outer sleeves 150, 152, whose ends may be closed off by lubrication seals 154, 156. The first bearing 144a is shown as a double-row ball bearing with a fixed position in the bearing cartridge 148, while the second bearing 144b is shown as a double-row ball bearing that floats. Other bearing arrangements will be appreciated by persons skilled in wind turbine generator design. This includes arrangements with different types of bearings (e.g., different shapes and rows of rolling elements) and arrangements without a bearing cartridge, although providing such a cartridge has particular advantages which will be apparent based on the description below.

The generator 28 may further include an end adaptor 160 coupled to the rotor shaft 120 and extending out of the generator housing 104. In the embodiment shown, bolts 162 extend through the end adaptor 160 and a terminal flange 164 on the inner sleeve 150 of the bearing cartridge 148 before engaging the rotor shaft 120. Thus, the rotor shaft 120, inner sleeve 150, and end adaptor 160 rotate together. The end adaptor 160 extends away from the NDE shield 140 so as to be positioned outside of the generator housing 104.

Figure 5:
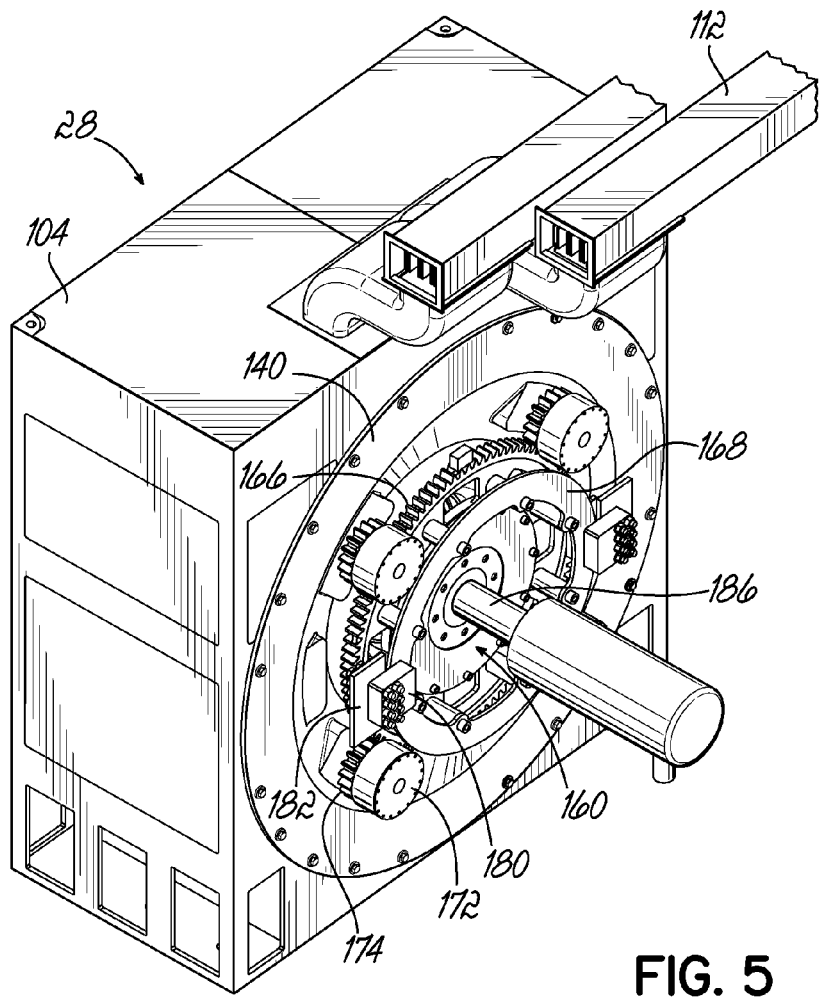
FIG. 5 is a rear perspective view of the generator in the power transmission system of FIG. 2.
Figure 6:
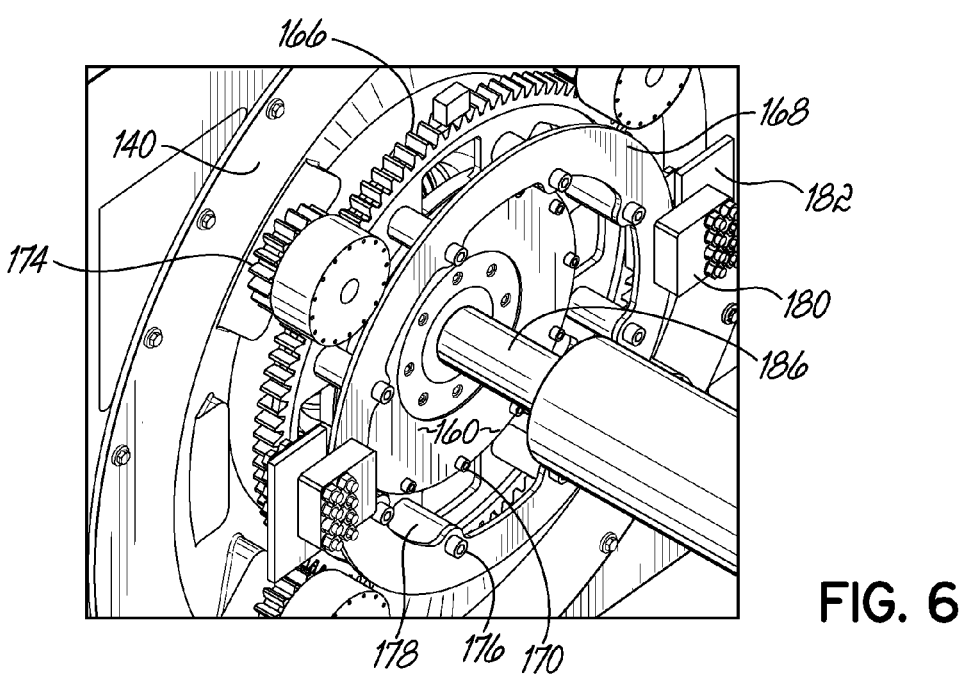
FIG. 6 is an enlarged view of a portion of the generator shown in FIG. 5.

Now referring to FIGS. 4A, 5, and 6, the end adaptor 160 in the illustrated embodiment supports both a turning gear 166 and brake disc 168. The turning gear 166 is mounted to the end adaptor 160 by bolts 170, but may alternatively be an integral portion of the end adaptor 160. Either way, the turning gear 166 is coupled to the rotor shaft 120 via the end adaptor 160. One or more auxiliary drives 172 are mounted to the NDE shield 140 and positioned next to the turning gear 166. The auxiliary drives 172 are configured to rotate respective pinions 174 that mesh with the turning gear 166. Thus, the auxiliary drives 172 may be controlled to rotate the turning gear 166 when it is necessary to turn the driven components of the power transmission system 10 (e.g., the rotor shaft 120, gearbox output member 80, gearbox input member 26, main shaft 16, etc.), which are operatively coupled to the end adaptor 160. Some of the auxiliary drives 172 may be used only during operation, while other may be used only during installation. The auxiliary drives 172 may comprise hydraulic motors in some embodiments.

The brake disc 168 is secured to the turning gear 166 by bolts 176 extending through spacers 178. Thus, the brake disc 168 is supported by the end adaptor 160 via the turning gear 166. In alternative embodiments, however, the brake disc 168 may be secured directly to the end adaptor 160. One or more brake calipers 180 are positioned about the brake disc 168 and configured to apply a friction braking force to the brake disc 168 during braking operations. The brake calipers 180 are supported by mounting brackets 182 secured to either the NDE shield 140 or a fixed structure in the nacelle, thereby fixing the brake calipers 180 relative to the brake disc 168. The structure for securing the mounting brackets 182 is not shown in the figures for sake of simplicity. Additionally, although not shown, the auxiliary drives 172, turning gear 166, and brake disc 168 may be housed within a removable cover secured to the NDE shield 140.

Finally, the power transmission system 10 further includes a pitch tube 186 extending through the gearbox 24 and generator 28. The pitch tube 186 accommodates hydraulic lines (not shown) and/or electrical cables routed through the main shaft 16 (FIG. 2) to the hub 6 for controlling the pitch system of the wind turbine 2. If desired, one or more bearings (not shown) may be provided between the pitch tube 186 and end adaptor 160 to support the pitch tube 186.

The above-described arrangement offers several advantages for manufacturing, installation, and service. As mentioned above, the generator bearing(s) 144 rotatably support the gearbox output member 80 in addition to the rotor 100 and, therefore, represent "shared" or "common" bearings for the gearbox 24 and generator 28. Common bearings are desirable in power transmission systems with integrated gearboxes and generators to reduce the number of components subject to wear, save material costs, provide a compact arrangement, etc. By locating the generator bearings 144 in the power transmission system 10 between the spindle 142 and rotor shaft 120, these objectives may be achieved without impacting the integration of the gearbox 24 and generator 28. The generator bearings 144 do not depend on the gearbox 24 for support, thereby allowing the generator 28 to be manufactured and assembled separately from the gearbox 24.

For example, the generator 28 may be manufactured in a first location and the gearbox 24 in a second location. The gearbox 24 and generator 28 may then be transported to a third location to complete the integration. During the transport of the gearbox 24, the gearbox housing 26 may temporarily support the gearbox output member 80. Alternatively, the gearbox output member 80 may be installed when completing the integration with the generator 28. During the transport of the generator 28, the DE shield 100 covers the DE side to help protect internal components. The integration of the gearbox 24 and generator 28 involves coupling the gearbox output member 80 to the rotor shaft 120 and coupling the NDE side of the generator housing 104 to the gearbox housing 32. The integration is more versatile in that positioning the generator bearings 144 between the gearbox 24 and generator 28 is not required to complete these steps. The steps may be performed at locations other than the sites of manufacturing, including on or near the site where the power transmission system 10 will be installed in a wind turbine. Indeed, if desired, the integration may even be performed "up-tower" after separately lifting the gearbox 24 and generator 28 to the nacelle of the wind turbine. Lifting the gearbox 24 and generator 28 separately may enable a crane with lower lifting capacity to be used to complete the installation of the wind turbine. Such cranes are typically less expensive and more readily available than cranes with lifting capacities sufficient to handle integrated gearboxes and generators for multi-megawatt wind turbines.

Figure 7A:
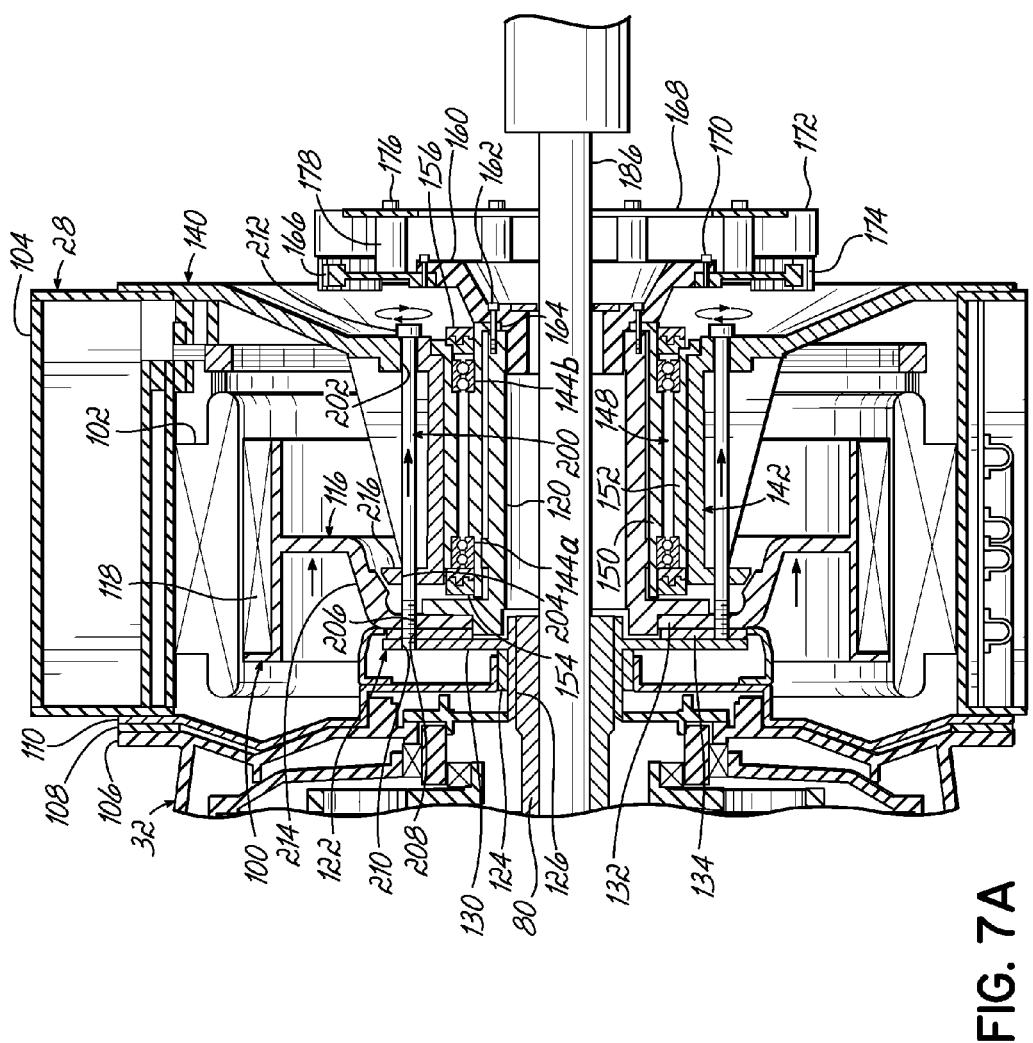

Once the power transmission system 10 is installed, the gearbox 24 and generator 28 may remain integrated even if access to the generator bearings 144 is required for inspection or service. To this end, FIGS. 7A-7C illustrate how the rotor 100 may be temporarily supported by the NDE shield 140 to allow easy removal of the generator bearings 144. This achieved by using the displacement elements 200 to move the rotor 100 toward the NDE shield 140. As mentioned above, the displacement elements 200 in the embodiment shown are elongated bolts. These displacement elements 200 extend through access holes 202 in the NDE shield 140 (and access holes 204 in the spindle 142 if necessary) before engaging threaded holes 206, 208, 210 in the rotor body 116, isolation member 134, and floating shaft 122. The displacement elements 200 may remain positioned in the generator 28 during operation or be inserted only when moving the rotor 100 is necessary. In the latter situation, the end adaptor 160 may be designed so that its removal is not required to insert the displacement elements 200 through the NDE shield 142.

When the displacement elements 200 are fully engaged with the rotor body 116, the rotor body 116 is spaced from the spindle 142. Each displacement element 200 includes a head portion 212 that abuts the NDE shield 140 and prevents further insertion/engagement. As a result, when rotated, the displacement elements 200 pull the rotor body 116, isolation member 124, and floating shaft 122 toward the NDE shield 140. Other configurations and types of displacement elements 200 for achieving the same movement when adjusted will be appreciated by skilled persons. Eventually the rotor body 116 contacts the spindle 142, which is configured to non-rotatably support the rotor 100. For example, an axially-extending portion 214 of the rotor body 116 may rest on a shoulder or flange 216 of the spindle 142 so as to be radially supported thereby. The spindle 142 may be designed to prevent further movement of the rotor 100 in the axial direction as well. As can be appreciated, the rotor 100 becomes temporarily "parked" on the spindle 142 when moved toward the NDE shield 140 such that the generator bearings 144 no longer need to rotatably support the rotor shaft 120.

It may be necessary or desirable to remove the end adaptor 160 before inserting the displacement elements 200 through the NDE shield 140 and/or before adjusting the displacement elements 200 to move the rotor 100. This may be accomplished by releasing the bolts 164 that secure the end adaptor 160 and bearing cartridge 148 to the rotor shaft 120. The end adaptor 160, turning gear 166, and brake disc 168 may then be moved away from the NDE shield 140 as an assembly, assuming the brake calipers 180 have been moved to a position to allow such movement. Alternatively, the brake disc 168, turning gear 166, and end adaptor 160 may be removed in separate steps (i.e., the brake disc 168 may first be removed from the turning gear 166, which may then be removed from the end adaptor 160, which may then be removed from the rotor shaft 120).

With rotor 100 non-rotatably supported on the spindle 142 and the end adaptor 160 removed, the generator bearings 144 are free to be removed. The bearing cartridge 148 allows the generator bearings 144 to be removed as an assembly (i.e., together with the inner sleeve 150 and outer sleeve 152), thereby reducing the number of steps that must be performed. The removal may be further facilitated by designing the rotor 100 to contact the bearing cartridge 148 as the rotor 100 moves toward the spindle 142. Further moving the rotor 100 toward its "parked" position on the spindle 142 pushes the bearing cartridge 148 out from the spindle 142. The bearing cartridge 148 may then be easily gripped and pulled away to complete the removal. To install new generator bearings, the above-described steps may then be performed in a reverse order.

As can be appreciated, the generator bearings 144 may be accessed, removed, and installed with the generator 28 remaining integrated with the gearbox 24 (i.e., the generator housing 104 may remain coupled to the gearbox housing 32 and the rotor 100 may remain coupled to the gearbox output member 80). Moreover, the rotor 100 and stator 102 may remain positioned within the generator 100 during these procedures. Even further, the NDE shield 140 may remain in position (i.e., coupled to the generator housing 104. These aspects may reduce the complexity and time associated with the procedures such that wind turbine downtime and lost power production can be minimized.

Advantageously, the rotor 100 may be supported by spindle 142 not only for service of the generator bearings 144, but also for transportation and other handling operations. For example, the generator manufacturer may assemble the generator 28 with the rotor 100 parked on the spindle 142 in the manner described above. This alleviates loads on the generator bearings 144 and helps prevent wear or other damage that may be caused due to periods of standstill prior to operation. Indeed, the generator 28 may even be supplied without the generator bearings 144 installed. The installation of the generator bearings 144 (and bearing cartridge 148, if present) may be performed at a later stage, such as before or after integrating the gearbox 24 and generator 28.

Figure 8:
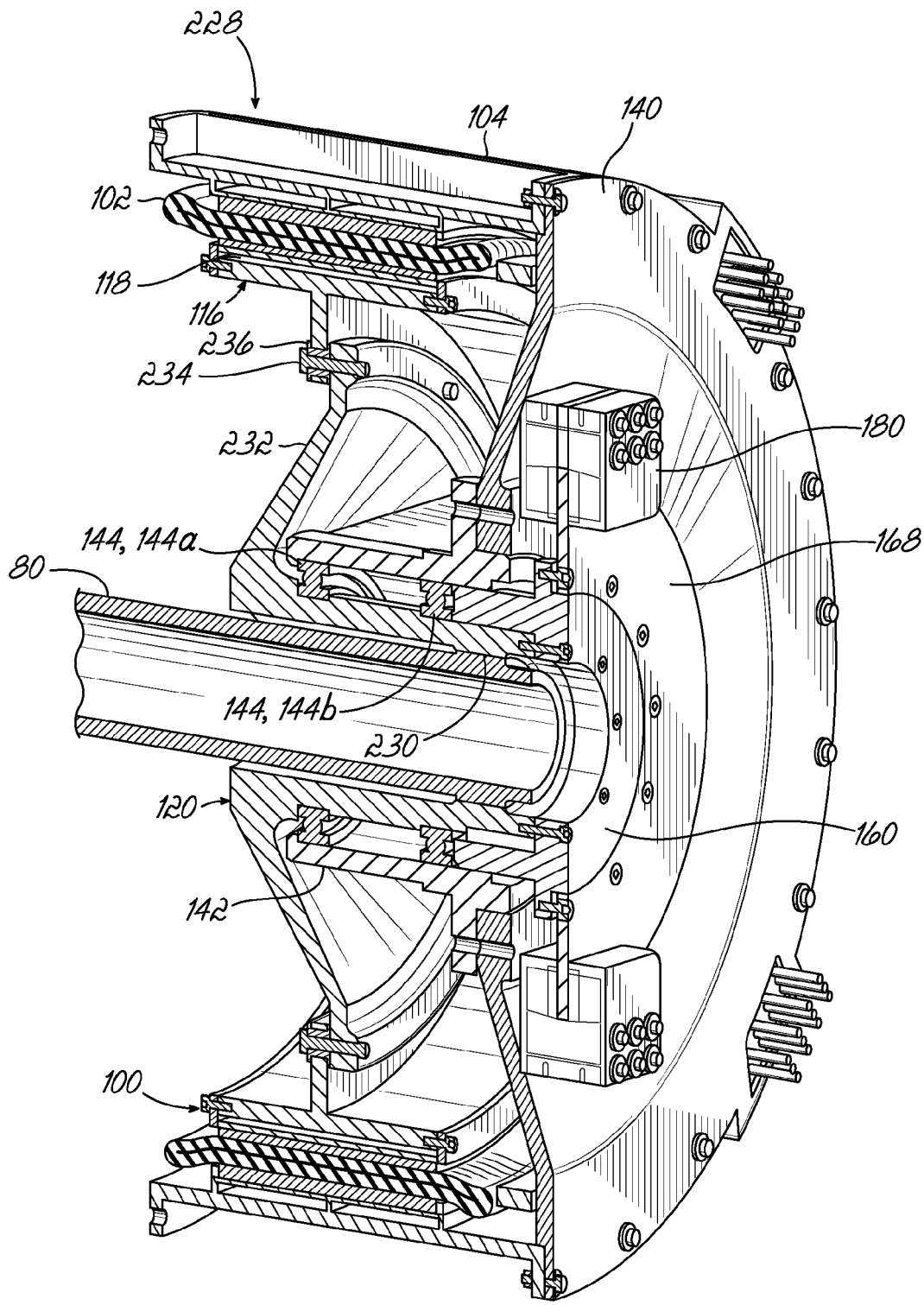
FIG. 8 is a cross-sectional perspective view showing a generator according to an alternative embodiment.

The embodiments described above are merely examples of the invention defined by the claims that appear below. Those skilled in the design of wind turbine generators will appreciate additional examples, modifications, and advantages based on the description. FIG. 8, for example, illustrates an embodiment of a generator 228 incorporating several of the variations mentioned above. The same reference numbers are used in the figure to refer to corresponding structure. As can be seen, the gearbox output member 80 in this embodiment extends into the rotor shaft 120 and is directly coupled thereto by a spline coupling 230; there is no floating shaft or the like. The position of the spline coupling 230 may be selected to help tune the dynamic behavior of the power transmission system 10. Thus, although the spline coupling 230 is shown on or near end portions of the gearbox output member 80 and rotor shaft 120, the spline coupling 230 may alternatively be positioned elsewhere along the length of the rotor shaft 120.

The rotor shaft itself may have a different shape due to this different coupling arrangement with the gearbox output member 80. In particular, the rotor shaft 120 may include a cone or disc-like portion 232 extending further radially (compared to the embodiment of FIGS. 3-7C) before being coupled to the rotor body 116. The coupling may be achieved by bolts 234, and each bolt 234 may be surrounded by an isolation member 236 to help prevent the transfer of electrical currents from the rotor body 116 to the rotor shaft 120 and gearbox output member 80. The generator bearings 144 in the embodiment of FIG. 8 are still positioned between the rotor shaft 120 and spindle 142, but are not housed in a bearing cartridge. Another element not shown in FIG. 8 is a turning gear secured to the end adaptor 160. A turning gear and one or more auxiliary drives may instead be positioned elsewhere in the power transmission system 10, such as between the gearbox 24 and generator 28.

Just as the shape of the rotor 100 may be different in alternative embodiments, the same consideration may apply to the spindle 142. Although not shown herein, the spindle could, for example, extend in the axial direction outwardly from the generator (i.e., away from the DE and NDE sides) rather than inwardly. The rotor shaft would need to extend further to be surrounded by the spindle in such an embodiment.

Figure 9:
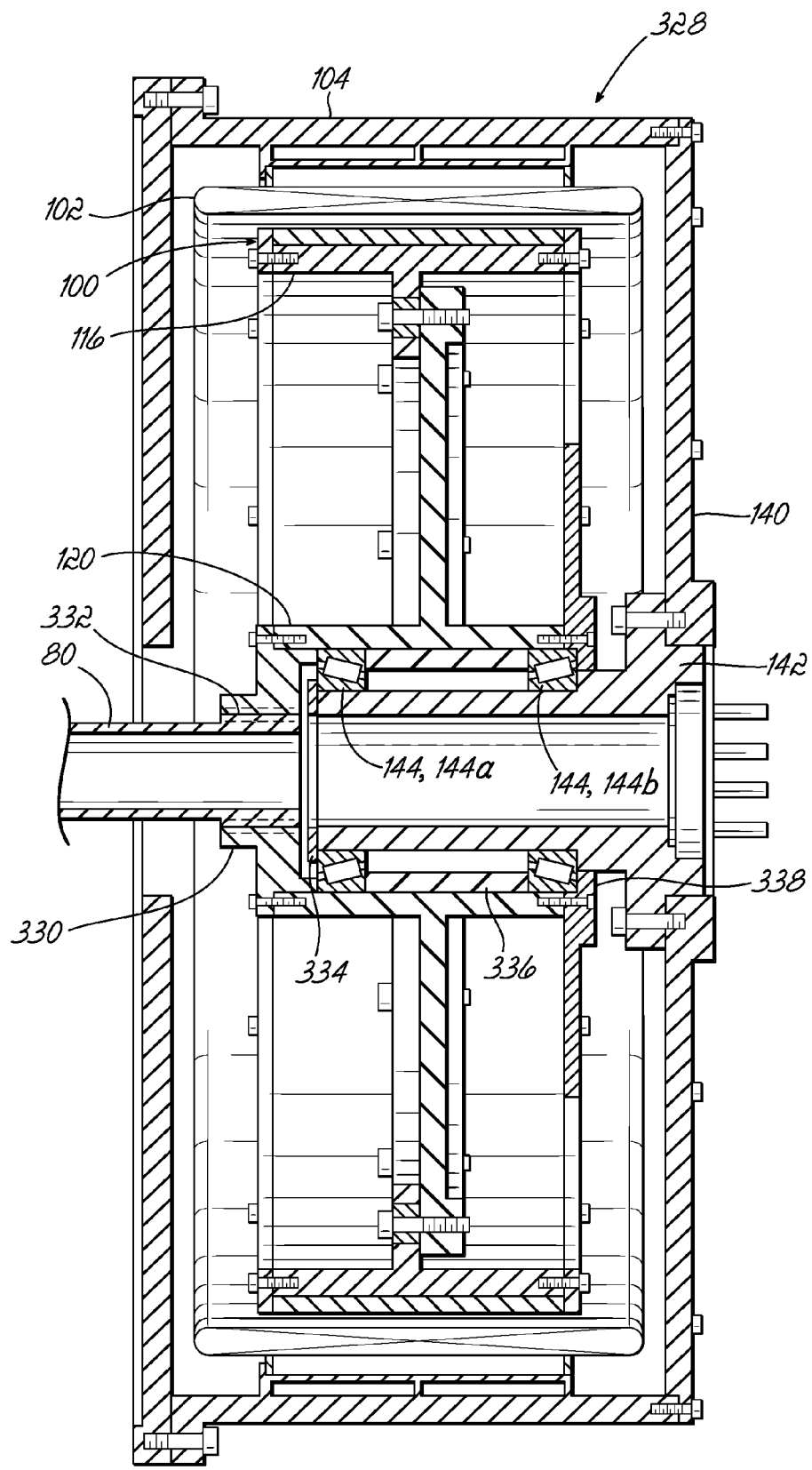
FIG. 9 is a cross-sectional elevational view shown a generator according to another alternative embodiment.

Again, these and other variations will be appreciated by skilled persons. This is particularly true with respect to the arrangement of the generator bearings 144 in relation to the spindle 142. For example, although FIGS. 3-8 illustrate the spindle 142 being positioned radially outward relative to the rotor shaft 120 so as to surround the generator bearings 144, the position of the spindle and rotor shaft may be reversed in alternative embodiments. That is, the spindle may be positioned radially inward relative to the rotor shaft such that the rotor shaft surrounds the generator bearings. FIG. 9 shows an example of a generator 328 according such an embodiment, with the same reference numbers being used to refer to structure corresponding to that in FIGS. 3-8. Only the differences from previous embodiments will be described below.

The gearbox output member 80 in FIG. 9 is coupled to a shaft adaptor 330, which in turn is coupled to the rotor shaft 120 (e.g., by a spline coupling 332). The rotor shaft 120 extends axially within the generator 28 and has a greater internal diameter than the spindle 142. Thus, the spindle 142 extends from the NDE shield 140 into the rotor shaft 120. The generator bearings 144 are positioned between the spindle 142 and rotor shaft 120. Similar to the other embodiments discussed above, first and second generator bearings 144a, 144b are shown. The first and second generator bearings 144a, 144b are spaced apart and may be located axially using an end plate 334 on an end of the spindle 142, a spacer 336 positioned between the first and second generator bearings 144a, 144b, and an end plate 338 on the rotor shaft 120. Because the rotor shaft 120 surrounds the first and second generator bearings 144a, 144b, the rotor shaft 120 and rotor body 116 may be designed so that the rotor 100 has a center of mass located in a plane between the first and second generator bearings 144a, 144b. This provides a more even distribution of loads between the first and second generator bearings 144a, 144b, especially when the plane is centered between the first and second generator bearings 144a, 144b.

In light of the above, the details of any particular embodiment should not be seen to necessarily limit the scope of the claims below. Indeed, in addition to appreciating other modifications and variations, skilled persons will understand how features of the various embodiments may be combined in different ways.

What is claimed:

1. A power transmission system for a wind turbine, comprising:
   a gearbox having a gearbox housing and a gearbox output member extending from the gearbox housing; and
   a generator including:
      a generator housing having a drive-end side and non-drive-end side, the drive-end side being coupled to the gearbox housing;
      a stator supported by the generator housing between the drive-end side and non-drive-end side;
      a rotor having a rotor shaft coupled to the gearbox output member so as to be driven thereby and a rotor body supported by the rotor shaft, at least a portion of the rotor shaft extending in an axial direction;
      a non-drive-end shield coupled to the non-drive-end side of the generator housing;
      a spindle extending from the non-drive-end shield in the axial direction; and
      at least one generator bearing positioned between the rotor shaft and spindle, wherein the at least one generator bearing supports the gearbox output member and rotor shaft.

2. The power transmission system according to claim 1, wherein the spindle extends in the axial direction toward the drive-end side of the generator housing.

3. The power transmission system according to claim 1, wherein the spindle is a separate component secured to the non-drive-end shield.

4. The power transmission system according to claim 3, wherein the spindle is integrally formed with the non-drive-end shield.

5. The power transmission system according to claim 1, wherein the spindle is positioned radially outward relative to the rotor shaft.

6. The power transmission system according claim 5, wherein the spindle is spaced from the rotor but configured to contact the rotor when the rotor is moved toward the non-drive-end shield.

7. The power transmission according to claim 6, wherein the rotor includes an axially-ending portion and the spindle includes a shoulder confronting the axially-extending portion, the shoulder being configured to radially support the axially-extending portion when the rotor is moved toward the non-drive-end shield.

8. The power transmission system according to claim 1, further comprising:
   a turning gear coupled to the rotor shaft; and
   at least one auxiliary drive mounted to the non-drive-end shield and configured to rotate the turning gear.

9. The power transmission system according to claim 8, further comprising:
   an end adaptor coupled to the rotor shaft and extending out of the generator housing, the turning gear being coupled to the rotor shaft via the end adaptor;
   a brake disc supported by the end adaptor; and
   at least one brake caliper fixed relative to the brake disc and configured to apply friction thereto.

10. The power transmission system according to claim 9, wherein the brake caliper is mounted to the non-drive-end shield.

11. The power transmission system according to claim 1, wherein the spindle is positioned radially inward relative to the rotor shaft.

12. The power transmission system according to claim 1, wherein the at least one generator bearing comprises first and second generator bearings spaced apart from each other, and further wherein the rotor has a center of mass located in a plane between the first and second generator bearings.

13. The power transmission system according to claim 1, wherein the generator further includes a bearing cartridge housing the at least one generator bearing.

14. The power transmission system according to claim 1, wherein the at least one generator bearing is the only rotatable support for the gearbox output member and rotor shaft.

15. The power transmission system according to claim 1, wherein the generator further includes a drive-end shield coupled to and covering the drive-end-side of the generator housing.

16. A method of assembling or servicing a power transmission system for a wind turbine, comprising:
   providing a gearbox having a gearbox housing and a gearbox output member extending from the gearbox housing;
   providing a generator having a generator housing with a drive-end side and non-drive-end side, a stator supported by the generator housing between the drive-end side and non-drive-end side, a non-drive-end shield coupled to the non-drive-end side, a spindle extending from the non-drive-end shield in the axial direction, and a rotor with a rotor shaft and rotor body supported by the rotor shaft, wherein at least a portion of the rotor shaft extends in an axial direction;
   positioning at least one generator bearing between the rotor shaft and spindle, wherein the at least one generator bearing supports the gearbox output member and rotor shaft; and
   integrating the gearbox and generator by:
      coupling the drive-end side of the generator housing to the gearbox housing; and
      coupling the rotor shaft to the gearbox output member.

17. The method according to claim 16, wherein the gearbox and generator are integrated before positioning the at least one generator bearing.

18. The method according to claim 16, further comprising:
   removing the at least one generator bearing from the generator, wherein the gearbox and generator remain integrated while the at least one generator bearing is removed.

19. The method according to claim 18, wherein the non-drive-end shield remains coupled to the generator housing while the at least one generator is being removed.

20. The method according to claim 16, further comprising:
   moving the rotor toward the non-drive-end shield until the rotor contacts the spindle; and
   non-rotatably supporting the rotor on the spindle.

21. The method according to claim 20, wherein the rotor includes an axially-ending portion and the spindle includes a shoulder confronting the axially-extending portion, and further wherein the shoulder radially supports the axially-extending portion when the rotor is moved toward the non-drive-end shield.

22. The method according to claim 20, wherein displacement elements extend through the non-drive-end shield and engage the rotor, and further wherein moving the rotor toward the non-drive-end shield comprises:
   adjusting the displacement elements to pull the rotor toward the non-drive-end shield.

23. The method according to claim 16, wherein positioning the at least one generator bearing comprises inserting a bearing cartridge between the rotor shaft and spindle, the at least one generator bearing being housed within the bearing cartridge.

* * * * *

UNITED STATES PATENT AND TRADEMARK OFFICE
CERTIFICATE OF CORRECTION

PATENT NO. : 8,907,517 B2
APPLICATION NO. : 13/879985
DATED : December 9, 2014
INVENTOR(S) : Peter Mongeau et al.

Page 1 of 2

It is certified that error appears in the above-identified patent and that said Letters Patent is hereby corrected as shown below:

In the Specification

Column 1, Line 11
"POWER TRANSMISSION SYS IEM" should be -- POWER TRANSMISSION SYSTEM --

Column 2, Line 45
"without having de-couple the" should be -- without having to de-couple the --

Column 6, Line 35
"may a separate component" should be -- may be a separate component --

Column 8, Lines 28-29
"This achieved by using the" should be -- This is achieved by using the --

Column 9, Line 34
PARENTHESIS MISSING should be -- position (i.e., coupled to the generator housing 104). --

Column 10, Line 36
"according such an embodiment" should be -- according to such an embodiment --

In the Claims

Column 11, Line 36, Claim 6
"The power transmission system according claim 5" should be -- The power transmission system according to claim 5 --

Signed and Sealed this
Fourteenth Day of July, 2015

Michelle K. Lee
*Director of the United States Patent and Trademark Office*

CERTIFICATE OF CORRECTION (continued)
U.S. Pat. No. 8,907,517 B2

Column 11, Line 41, Claim 7
"the rotor includes an axially-ending portion" should be -- the rotor includes an axially-extending portion --

Column 12, Line 51, Claim 21
"includes an axially-ending portion" should be -- includes an axially-extending portion --